(12) United States Patent
Naraki et al.

(10) Patent No.: US 11,233,541 B2
(45) Date of Patent: Jan. 25, 2022

(54) COMMUNICATION CONTROL DEVICE, COMMUNICATION CONTROL SYSTEM, AND COMMUNICATION CONTROL METHOD

(71) Applicant: Panasonic Intellectual Property Management Co., Ltd., Osaka (JP)

(72) Inventors: Atsutoshi Naraki, Kanagawa Ken (JP); Yasuyuki Kondo, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/212,709

(22) Filed: Mar. 25, 2021

(65) Prior Publication Data

US 2021/0306034 A1    Sep. 30, 2021

(30) Foreign Application Priority Data

Mar. 31, 2020    (JP) .............................. JP2020-064904

(51) Int. Cl.
| | |
|---|---|
| *H02J 7/02* | (2016.01) |
| *H02J 50/12* | (2016.01) |
| *H04B 5/00* | (2006.01) |
| *H04W 8/00* | (2009.01) |

(52) U.S. Cl.
CPC ......... *H04B 5/0037* (2013.01); *H04B 5/0031* (2013.01)

(58) Field of Classification Search
None
See application file for complete search history.

(56) References Cited

U.S. PATENT DOCUMENTS

| | | | | |
|---|---|---|---|---|
| 7,772,802 | B2 * | 8/2010 | Manico | H02J 7/025 320/108 |
| 7,791,312 | B2 * | 9/2010 | Kook | H02J 7/0044 320/108 |
| 9,065,157 | B2 * | 6/2015 | Van Wiemeersch | H02J 7/007194 |
| 9,508,246 | B2 * | 11/2016 | Okano | B60R 25/406 |
| 9,716,396 | B2 * | 7/2017 | Lee | H02J 50/40 |
| 10,090,696 | B2 * | 10/2018 | Lee | H02J 50/10 |

(Continued)

FOREIGN PATENT DOCUMENTS

| | | |
|---|---|---|
| JP | 2014-007949 A | 1/2014 |
| JP | 2015-154159 A | 8/2015 |

*Primary Examiner* — Tuan A Tran
(74) *Attorney, Agent, or Firm* — Greenblum & Bernstein, P.L.C.

(57) ABSTRACT

A communication control device includes a memory, and a hardware processor coupled to the memory. The hardware processor is configured to: acquire, via communication based on a first non-contact communication method, terminal information of a portable terminal capable of being charged in a non-contact manner, the portable terminal being placed on or brought near to a non-contact charger disposed in a compartment of a vehicle; and control, based on a device type of the portable terminal based on the terminal information acquired by the acquisition unit, transmission of information to the portable terminal by a non-contact communicator that is disposed in the vehicle in association with the non-contact charger and capable of performing communication based on a second non-contact communication method.

20 Claims, 11 Drawing Sheets

(56) References Cited

U.S. PATENT DOCUMENTS

| | | | | |
|---|---|---|---|---|
| 10,122,184 | B2* | 11/2018 | Smadi | H02J 7/00 |
| 10,170,939 | B2* | 1/2019 | Asanuma | H02J 50/60 |
| 10,256,658 | B2* | 4/2019 | Hyun | H02J 7/0042 |
| 10,284,002 | B2* | 5/2019 | Lee | H02J 50/60 |
| 10,348,139 | B2* | 7/2019 | Piasecki | H02J 50/12 |
| 10,432,245 | B2* | 10/2019 | Byun | H02J 50/80 |
| 10,686,338 | B2* | 6/2020 | Lee | H04W 52/0296 |
| 10,749,384 | B2* | 8/2020 | Park | H02J 7/00034 |
| 10,879,747 | B2* | 12/2020 | Hong | H02J 7/025 |
| 10,998,751 | B2* | 5/2021 | Wan | H02J 7/007194 |
| 11,101,694 | B2* | 8/2021 | Lee | H02J 7/02 |
| 2018/0198313 | A1* | 7/2018 | Lee | H04B 5/0037 |
| 2019/0386505 | A1* | 12/2019 | Lin | H02J 50/40 |
| 2020/0021130 | A1* | 1/2020 | Wan | H02J 7/00 |

* cited by examiner

COMMUNICATION CONTROL DEVICE, COMMUNICATION CONTROL SYSTEM, AND COMMUNICATION CONTROL METHOD

CROSS-REFERENCE TO RELATED APPLICATIONS

This application is based upon and claims the benefit of priority from Japanese Patent Application No. 2020-064904, filed on Mar. 31, 2020, the entire contents of which are incorporated herein by reference.

FIELD

The present disclosure relates to a communication control device, a communication control system, and a communication control method.

BACKGROUND

In recent years, portable terminals such as a smartphone equipped with a processing circuit that enables short-range wireless communication such as Near Field Communication (NFC) have become widespread. Additionally, there have been developed a charging device that can charge such portable terminals in a non-contact manner using a wireless power transmission technique (for example, refer to Japanese Patent Application Laid-open No. 2014-007949).

Furthermore, Japanese Patent Application Laid-open No. 2015-154159 discloses a technique of selecting and switching a connection path between a power transmission unit and an NFC chip in the charging device to enable NFC communication between the charging device and the portable terminal in a case in which presence of a foreign object is detected when power is being transmitted from the non-contact charging device to the portable terminal.

However, according to the technique disclosed in Japanese Patent Application Laid-open No. 2015-154159, communication between the portable terminal and the charging device is indiscriminately controlled without considering a device type of the portable terminal.

Thus, the present disclosure provides a communication control device, a communication control system, and a communication control method that can appropriately control communication with the portable terminal based on a non-contact communication method depending on the device type of the portable terminal that is placed on or brought near to a non-contact charging unit.

SUMMARY

According to the present disclosure, a communication control device including: a memory; and a hardware processor coupled to the memory, the hardware processor being configured to: acquire, via communication based on a first non-contact communication method, terminal information of a portable terminal capable of being charged in a non-contact manner, the portable terminal being placed on or brought near to a non-contact charger disposed in a compartment of a vehicle; and control, based on a device type of the portable terminal based on the terminal information acquired by the acquisition unit, transmission of information to the portable terminal by a non-contact communicator that is disposed in the vehicle in association with the non-contact charger and capable of performing communication based on a second non-contact communication method, is provided.

Further, according to the present disclosure, a communication control system including: a memory; and a hardware processor coupled to the memory, the hardware processor being configured to: acquire, via communication based on a first non-contact communication method, terminal information of a portable terminal capable of being charged in a non-contact manner, the portable terminal being placed on or brought near to a non-contact charger disposed in a compartment of a vehicle; and control, based on a device type of the portable terminal based on the terminal information acquired by the acquisition unit, transmission of information to the portable terminal by a non-contact communicator that is disposed in the vehicle in association with the non-contact charger and capable of performing communication based on a second non-contact communication method, is provided.

Furthermore, according to the present disclosure, a communication control method performed by a communication control device, the communication control method including: acquiring, via communication based on a first non-contact communication method, terminal information of a portable terminal capable of being charged in a non-contact manner, the portable terminal being placed on or brought near to a non-contact charger disposed in a compartment of a vehicle; and controlling, based on a device type of the portable terminal based on the acquired terminal information, transmission of information to the portable terminal by a non-contact communicator that is disposed in the vehicle in association with the non-contact charger and capable of performing communication based on a second non-contact communication method, is provided.

DETAILED DESCRIPTION

Figure 1:
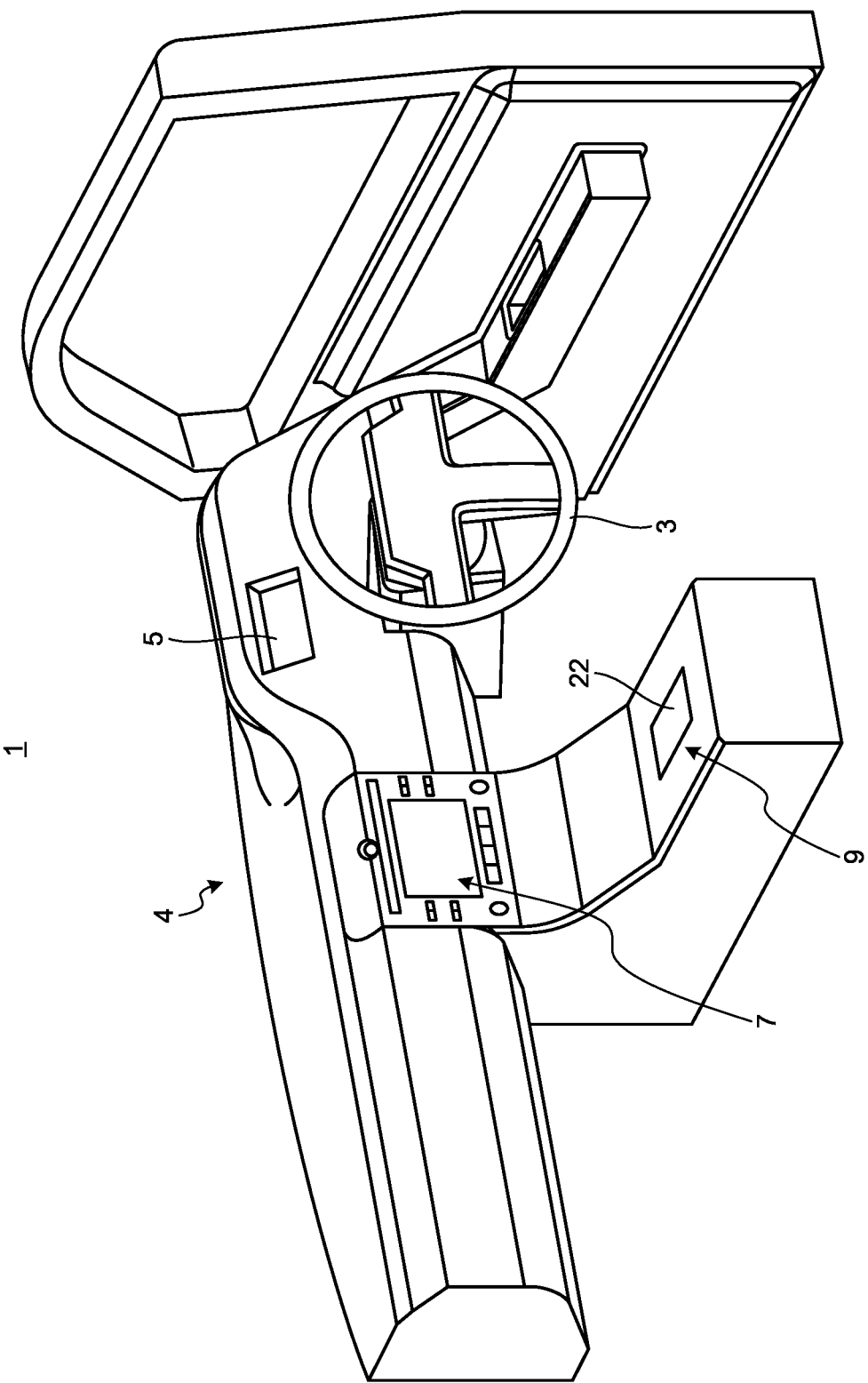
FIG. 1 is a perspective view illustrating an example of an inner part of a compartment 1 of a vehicle according to an embodiment of the present disclosure.

The following describes a preferred embodiment of the present disclosure in detail with reference to the attached drawings. Throughout the present specification and the drawings, constituent elements having substantially the same functional configuration are denoted by the same reference numeral, and redundant description thereof will not be repeated.

1. Embodiment

1-1. Configuration Example of Compartment 1

FIG. 1 is a perspective view illustrating an example of an inner part of a compartment 1 of a vehicle according to an embodiment of the present disclosure. As illustrated in FIG. 1, for example, a steering wheel 3, a dashboard 4, a meter panel (instrument panel) 5, a center display 7, a charging device 9, and the like are disposed in the compartment 1. For example, the steering wheel 3 and the meter panel 5 are disposed to be opposed to a driver's seat (not illustrated) in the compartment 1.

The steering wheel 3 is a physical device with which a driver provides instructions to steer the vehicle.

The meter panel 5 is a device for visually notifying (for example, displaying) a driver of information indicating a state inside the vehicle or a situation outside the vehicle. The meter panel 5 is disposed on the dashboard 4, for example. The meter panel 5 may include a display such as a liquid crystal display (LCD) or an organic light emitting diode (OLED), or one or more light emitting units such as a light emitting diode (LED), for example.

As illustrated in FIG. 1, the center display 7 is disposed on a side of the meter panel 5 on the dashboard 4, for example. The center display 7 includes a display unit and an operation unit, for example, and may be connected to one or more engine control units (ECUs) mounted in the vehicle, for example. The display unit includes a display such as an LCD or an OLED, for example. The display unit can display the display screens of various applications (for example, car navigation, a music reproduction application, or a television reproduction application) based on control by one or more central processing units (CPUs) or the one or more ECUs that may be incorporated in the center display 7. For example, the operation unit includes a button for operation, a user interface such as a touch panel, and the like. The display unit and the operation unit may be integrally configured as a touch display, for example.

The charging device 9 is a device that enables non-contact charging. The charging device 9 is an example of a communication control system according to the present disclosure. For example, in a case in which a portable terminal 30 that can be charged in a non-contact manner is placed on or brought near to a non-contact charging unit (non-contact charger) 22 included in the charging device 9, the charging device 9 can charge the portable terminal 30 in a non-contact manner. As illustrated in FIG. 1, the charging device 9 may be disposed to be opposed to the dashboard 4 (for example, in the vicinity of the center display 7) on a side of the driver's seat, for example.

1-2. Configuration Example of Charging Device 9

Figure 2:
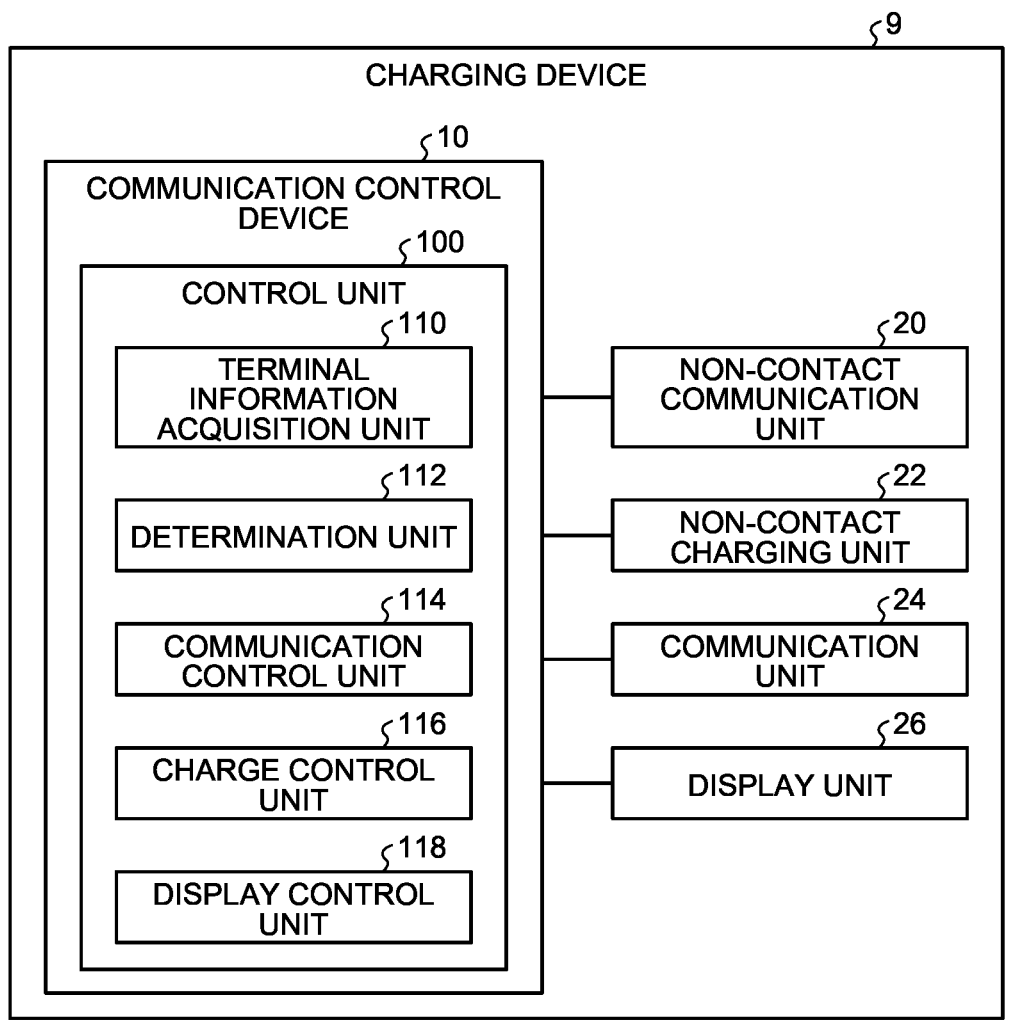
FIG. 2 is a block diagram illustrating an example of a functional configuration of a charging device 9 according to the embodiment.

The following describes a functional configuration of the charging device 9 with reference to FIG. 2. FIG. 2 is a block diagram illustrating an example of the functional configuration of the charging device 9 according to the present embodiment. As illustrated in FIG. 2, the charging device 9 includes a non-contact communication unit (non-contact communicator) 20, a non-contact charging unit 22, a communication unit (communicator) 24, a display unit (display) 26, and a communication control device 10, for example.

1-2-1. Non-Contact Charging Unit 22

The non-contact charging unit 22 charges the portable terminal 30 that is placed on or brought near to the non-contact charging unit 22 in a non-contact manner under control by the communication control device 10 (for example, a charge control unit 116 described later). For example, the non-contact charging unit 22 performs charging based on a predetermined wireless power transfer method (for example, Qi standard) using a principle of electromagnetic induction.

The non-contact charging unit 22 can communicate with the portable terminal 30 that is placed on or brought near to the non-contact charging unit 22 using a predetermined communication method based on wireless power transfer. Due to this, the non-contact charging unit 22 can detect whether the portable terminal 30 (compatible with the predetermined wireless power transfer method) is placed on or brought near to the non-contact charging unit 22. The predetermined communication method based on wireless power transfer is an example of a first non-contact communication method according to the present disclosure.

1-2-2. Non-Contact Communication Unit 20

The non-contact communication unit 20 can perform communication in a non-contact manner based on a predetermined communication method of short-range wireless communication (for example, NFC) under control by the communication control device 10 (for example, a communication control unit 114 described later). As described later, the non-contact communication unit 20 can receive information for pairing for enabling communication conforming to a predetermined wireless communication standard (for example, Bluetooth (registered trademark) or Wi-Fi (registered trademark)) from the portable terminal 30 via the non-contact communication. In this case, for example, when the information for pairing is transmitted to car audio equipment (for example, the center display 7) that is connected to the charging device 9 in a wired or wireless manner, automatic connection (for example, pairing) may be enabled between the car audio equipment and the portable terminal 30 for communication conforming to the predetermined wireless communication standard.

For example, the non-contact communication unit 20 can communicate with the portable terminal 30 that is placed on or brought near to the non-contact charging unit 22 and compatible with the predetermined communication method of short-range wireless communication in a non-contact manner based on the communication method. In the charging device 9, the non-contact charging unit 22 and the non-contact communication unit 20 may be disposed in association with each other. For example, the non-contact charging unit 22 and the non-contact communication unit 20 may be disposed to be adjacent to each other in the charging device 9, or may be integrally configured.

1-2-3. Communication Unit 24

The communication unit 24 can communicate with an external device of the charging device 9 using a communication method different from the predetermined communication method of short-range wireless communication under control by the communication control device 10 (for example, the communication control unit 114 described later). For example, the communication unit 24 may be capable of communicating with one or more ECUs disposed in the vehicle via a vehicle-mounted network (for example, a controller area network (CAN), a local interconnect network (LIN), FlexRay (registered trademark), or Ethernet (registered trademark)).

Additionally, or Alternatively, the communication unit 24 may be capable of communicating with an external device of the vehicle (for example, a data center, a roadside machine, or another vehicle) in a wireless manner using a communication protocol such as Internet Protocol (IP), for example. For example, the communication unit 24 communicates with an external device of the vehicle via at least one of a cellular telephone network (cellular network), a wireless local area network (LAN), an electronic toll collection system (ETC), dedicated short range communications (DSRC), Vehicle-to-Infrastructure (V2I), and Vehicle-to-Vehicle (V2V).

1-2-4. Display Unit 26

The display unit 26 includes, for example, a display such as an LCD or an OLED, and/or light emitting units such as one or more LEDs. The display unit 26 may be capable of displaying display information such as one or more images or one or more character strings, for example, or may be capable of changing color of light to be emitted, luminance of light, or a blinking pattern of light under control by the communication control device 10 (for example, a display control unit 118 described later).

1-3. Summary of Problems

The constituent elements other than the communication control device 10 included in the charging device 9 have been described above. However, well-known portable terminals are assumed to include a device type that automatically performs predetermined processing (for example, processing related to predetermined payment) at the time when communication is performed based on the predetermined communication method of short-range wireless communication described later. In this case, the processing related to the predetermined payment may be processing related to display control or communication control for information related to the predetermined payment, or processing for performing the predetermined payment itself.

However, according to the well-known technique (for example, the technique disclosed in Japanese Patent Application Laid-open No. 2015-154159), communication between the charging device and the portable terminal is indiscriminately controlled without considering the device type of the portable terminal that is placed on or brought near to the non-contact charging device.

Figure 3A:
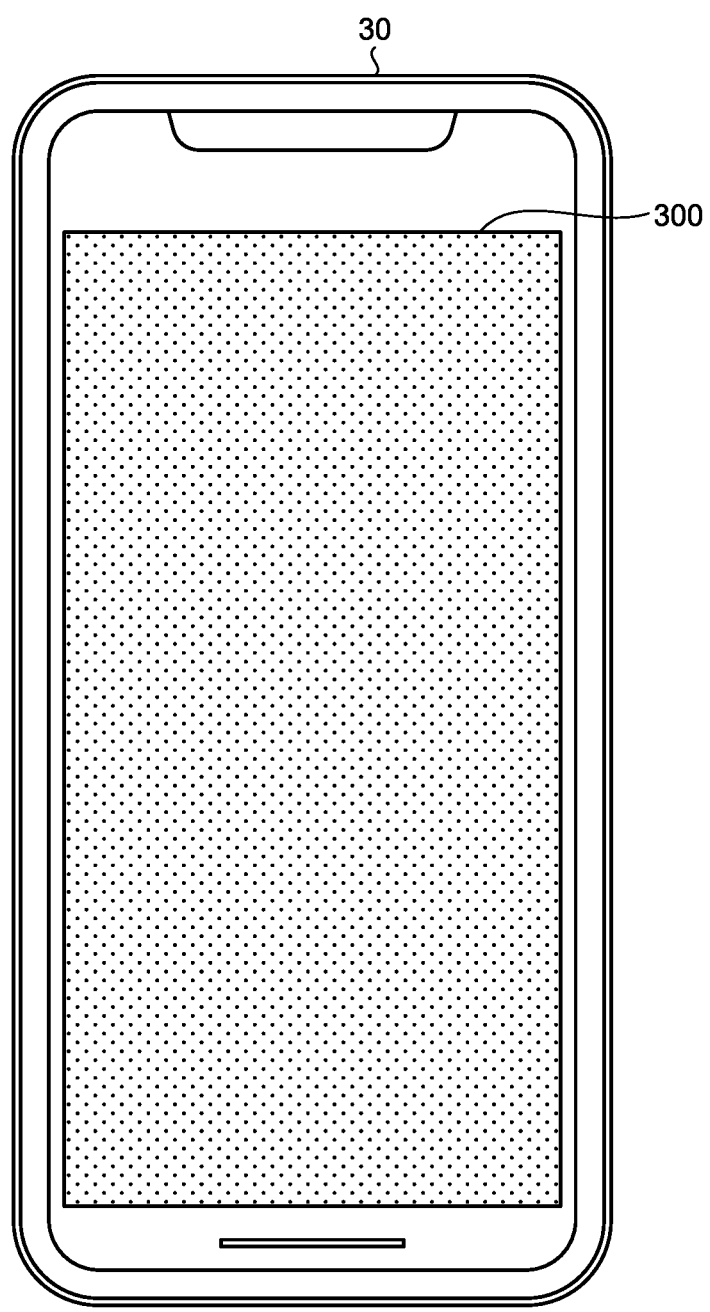
FIG. 3A is a diagram illustrating an example of an external appearance of a portable terminal 30 according to the embodiment.

This point will be described below in detail with reference to FIG. 3A and FIG. 3B. FIG. 3A is a diagram illustrating an example of an external appearance of the portable terminal 30. For example, FIG. 3A illustrates a display example of an image (a lock screen and the like) on a display unit 300 before communication based on the predetermined communication method of short-range wireless communication is started between the non-contact charging device according to the well-known technique and the portable terminal 30. In this case, the device type of the portable terminal 30 is assumed to be a device type in which a predetermined payment application is automatically started at the time when communication based on the predetermined communication method of short-range wireless communication is started.

Figure 3B:
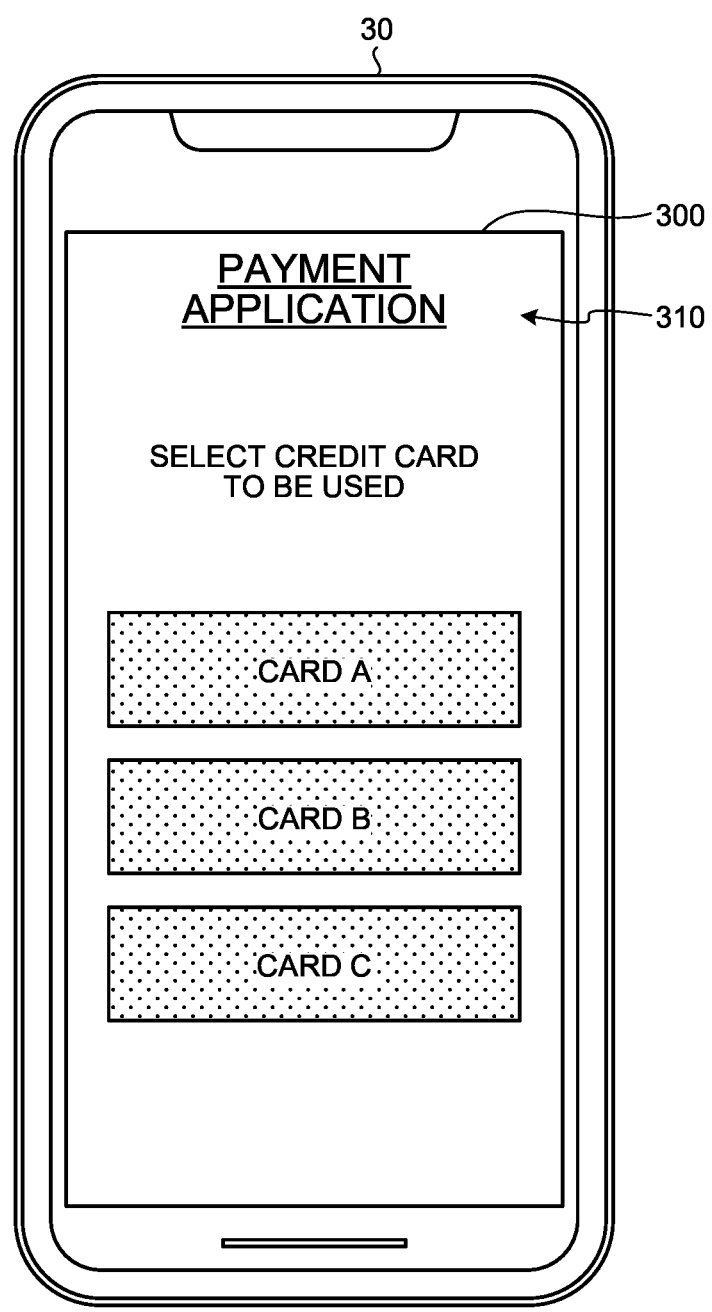
FIG. 3B is a diagram illustrating a display example of a screen of a payment application of the portable terminal 30 according to the embodiment.

FIG. 3B is a diagram illustrating a display example of an image on the display unit 300 after the communication is started. As illustrated in FIG. 3B, after the communication is started, the portable terminal 30 automatically displays a predetermined screen (for example, a startup screen) of the predetermined payment application on the display unit 300. Due to this, the user who is using the portable terminal 30 may be surprised by misunderstanding that some payment processing (for example, accounting processing) is automatically performed by the predetermined payment application. As a result, the user may misunderstand that some payment processing may be automatically performed if the portable terminal 30 is continuously placed on or brought near to the charging device, so that the user may determine to stop using the charging device.

From a point of view of the situation described above, the communication control device 10 according to the present embodiment has been created. According to the present embodiment, the communication control device 10 acquires terminal information of the portable terminal 30 that is placed on or brought near to the non-contact charging unit 22 via communication based on the first non-contact communication method. In this case, the terminal information of the portable terminal 30 is information for specifying the portable terminal 30, and may include manufacturer information of the terminal, a model name of the terminal, and a device ID of the terminal, for example. The communication control device 10 can control transmission of the information to the portable terminal 30 by the non-contact communication unit 20 based on the device type of the portable terminal 30 based on the acquired terminal information. Due to this, the communication control device 10 can appropriately control transmission of the information to the portable terminal 30 based on the non-contact communication method depending on the device type of the portable terminal 30.

1-4. Configuration Example of Communication Control Device 10

Next, the following describes a configuration example of the communication control device 10 according to the present embodiment in detail with reference to FIG. 2. Description about the same content as that described above will not be repeated.

As illustrated in FIG. 2, the communication control device 10 includes a control unit 100. The control unit 100 includes a processor 150, a memory 152, and the like (described later). The control unit 100 centrally controls the communication control device 10. As illustrated in FIG. 2, the control unit 100 also includes a terminal information acquisition unit 110, a determination unit 112, the communication control unit 114, the charge control unit 116, and a display control unit 118.

1-4-1. Terminal Information Acquisition Unit 110

The terminal information acquisition unit 110 is an example of an acquisition unit according to the present disclosure. The terminal information acquisition unit 110 acquires terminal information of the portable terminal 30 that is placed on or brought near to the non-contact charging unit 22 via communication based on the predetermined communication method based on wireless power transfer.

For example, under control by the charge control unit 116 (described later), the non-contact charging unit 22 may detect whether the portable terminal 30 is placed on or brought near to the non-contact charging unit 22 by continuously performing communication based on the predetermined communication method based on wireless power transfer. In a case in which it is detected that the portable terminal 30 is placed on or brought near to the non-contact charging unit 22, under control by the charge control unit 116, the non-contact charging unit 22 may receive the terminal information of the portable terminal 30 from the portable terminal 30 via communication based on the predetermined communication method based on wireless power transfer. In this case, the terminal information acquisition unit 110 may acquire, from the non-contact charging unit 22, the terminal information received by the non-contact charging unit 22.

1-4-2. Determination Unit 112

The determination unit 112 determines whether the device type of the portable terminal 30 that is placed on or brought near to the non-contact charging unit 22 is a predetermined device type (hereinafter, also referred to as a "specific device type" in some cases) based on the terminal information acquired by the terminal information acquisition unit 110. The specific device type is, for example, a device type that automatically performs predetermined processing when receiving information based on the predetermined communication method of short-range wireless communication from the non-contact communication unit 22 before transmitting information based on the predetermined communication method of short-range wireless communication to the non-contact communication unit 22.

For example, a storage unit (not illustrated) in the communication control device 10 may previously store data indicating a correspondence relation between whether the device type of the portable terminal 30 is the specific device type described above and the terminal information of the portable terminal 30. In this case, first, the determination unit 112 may compare the terminal information acquired by the terminal information acquisition unit 110 with the data indicating the correspondence relation to specify the device type of the portable terminal 30. Accordingly, the determination unit 112 may determine whether the specified device type is the same as the specific device type.

1-4-3. Communication Control Unit 114

1-4-3-1. First Control Example

The communication control unit 114 controls transmission of the information to the portable terminal 30 by the non-contact communication unit 20 based on a determination result obtained by the determination unit 112. For example, in a case in which the determination unit 112 determines that the device type of the portable terminal 30 is the specific device type, the communication control unit 114 controls the non-contact communication unit 20 to cause the non-contact communication unit 20 not to start to transmit the information to the portable terminal 30 based on the predetermined communication method of short-range wireless communication.

Accordingly, unless the communication control device 10 receives some information based on the predetermined communication method of short-range wireless communication described above from the portable terminal 30, for example, the non-contact communication unit 20 does not start to transmit the information based on the predetermined communication method of short-range wireless communication to the portable terminal 30. Thus, the following effect can be obtained. Before the communication based on the predetermined communication method of short-range wireless communication described above is started, like the display example illustrated in FIG. 3A, for example, a display screen (for example, a lock screen) different from a display screen corresponding to the predetermined processing described above (for example, the screen of the predetermined payment application described above) is displayed on the display unit 300 of the portable terminal 30. According to the control example described above, in this case, the non-contact communication unit 20 does not start to transmit the information to the portable terminal 30 based on the predetermined communication method of short-range wireless communication described above, so that the predetermined processing described above is not automatically performed in the portable terminal 30. Thus, the display screen corresponding to the predetermined processing can be prevented from being automatically displayed on the display unit 300 of the portable terminal 30 (unlike the display example according to the well-known technique illustrated in FIG. 3B, for example).

As another example, in a case in which the determination unit 112 determines that the device type of the portable terminal 30 is not the specific device type, the communication control unit 114 may control the non-contact communication unit 20 to allow the non-contact communication unit 20 to start to transmit the information to the portable terminal 30 based on the predetermined communication method of short-range wireless communication described above.

1-4-3-2. Second Control Example

After the non-contact charging unit 22 starts to charge the portable terminal 30 in a non-contact manner, the communication control unit 114 may further perform control described below. Specifically, after starting the charging, based on a determination result obtained by the determination unit 112 and a detection result of a change of a state related to non-contact charging, the communication control unit 114 may control transmission of second notification information for notifying the user of information corresponding to the detection result to the portable terminal 30. For example, in a case in which the determination unit 112 determines that the device type of the portable terminal 30 is not the specific device type described above, and the detection result indicates that the state related to the charging changes to a "predetermined state" described later, the communication control unit 114 may cause the non-contact communication unit 20 to transmit the second notification information for notifying that the state related to the charging changes to the predetermined state to the portable terminal 30. The detection result may be acquired through detection processing performed by the non-contact charging unit 22.

Alternatively, in a case in which some information based on the predetermined communication method of short-range wireless communication is received from the portable terminal 30 before the non-contact communication unit 20 starts to transmit the information to the portable terminal 30 based on the predetermined communication method of short-range wireless communication described above, the communication control unit 114 may perform control as described below. In this case, and when the detection result indicates that the state related to the charging changes to the predetermined state, the communication control unit 114 may control the non-contact communication unit 20 to transmit the second notification information to the portable terminal 30 irrespective of whether the device type of the portable terminal 30 is the specific device type.

Figure 4:
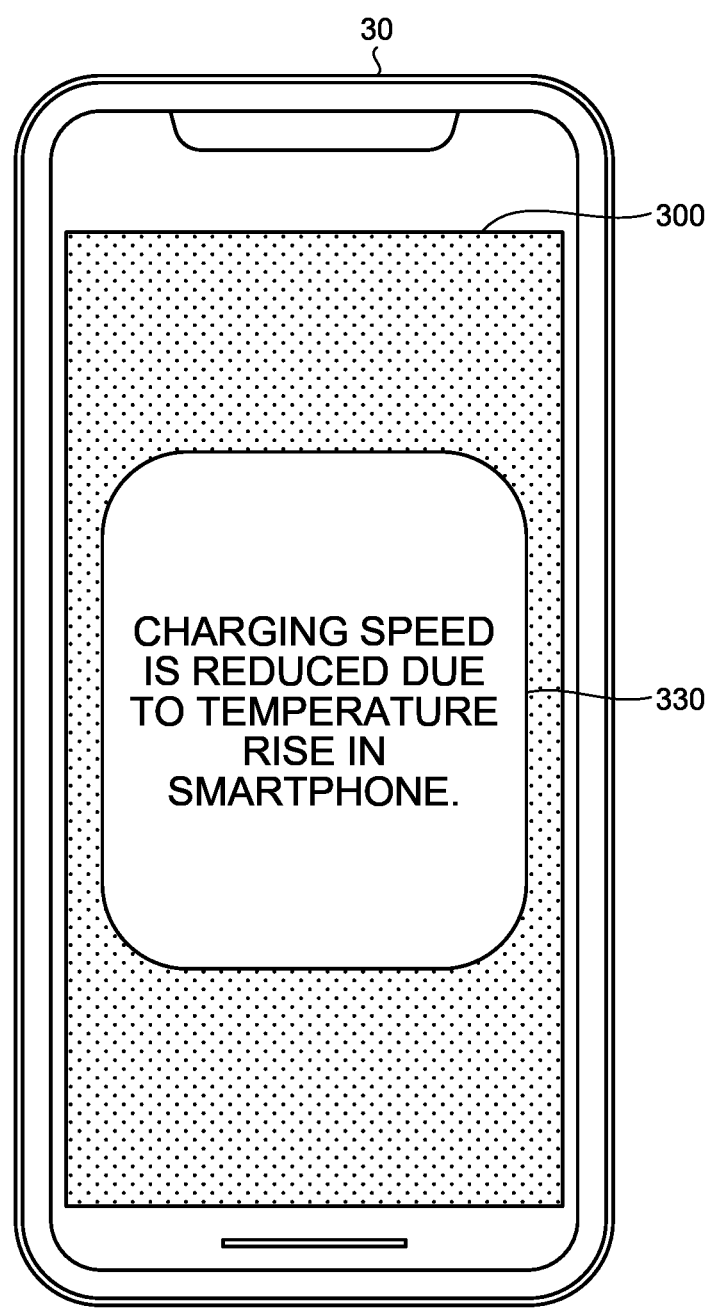
FIG. 4 is a diagram illustrating a display example of a message 330 indicating that a charging state becomes a predetermined state in the portable terminal 30 according to the embodiment.

In this case, the second notification information may include a character string (for example, "charging speed is reduced due to temperature rise in smartphone") for notifying the user that the state related to the charging performed by the non-contact charging unit 22 changes to the predetermined state. In this case, when the second notification information is transmitted to the portable terminal 30, the portable terminal 30 may display a message 330 (for example, a pop-up window) indicating content of the second notification information on the display unit 300 like the display example illustrated in FIG. 4, for example. Accordingly, the user can be notified that the state related to the charging changes to the predetermined state. FIG. 4 is a diagram illustrating a display example of the image on the display unit 300 of the portable terminal 30 at the time when the second notification information is transmitted to the portable terminal 30.

The second notification information is not limited to the example described above, and may be other kinds of information as described below, for example. For example, in a case in which it is specified that the portable terminal 30 that is placed on or brought near to the non-contact charging unit 22 is compatible with a boost charging mode, the second notification information may be control information for causing the portable terminal 30 to display a graphical user interface (GUI) (for example, a pop-up or an icon) to enable the user to shift the charging mode of charging performed by the non-contact charging unit 22 to the boost charging mode. Alternatively, the second notification information may be control information for causing the portable terminal 30 to display the GUI (for example, a pop-up or an icon) to enable the user to start to perform "predetermined change processing" described below. Alternatively, the second notification information may be notification information for notifying the user of an operation method for causing the charging device 9 or the portable terminal 30 to perform the "predetermined change processing". Examples of the predetermined change processing include switching a power supply of the charging device 9 from ON to OFF, switching charging that is being performed (by the non-contact charging unit 22) from ON to OFF, changing a value of a frequency for charging that is being performed to another value, or changing the charging mode to the boost charging mode from a normal mode. Details about content of these pieces of processing will be described later.

Every time it is detected that the state related to the charging performed by the non-contact charging unit 22 changes to the predetermined state described above, the communication control unit 114 may cause the non-contact communication unit 20 to transmit the second notification information to the portable terminal 30. Accordingly, every time the state related to the charging performed by the non-contact charging unit 22 changes to the predetermined state described above, the second notification information is received by the portable terminal 30, and may be stored therein as a log, for example.

Accordingly, the following two effects can be obtained. First, even in a case in which the user misses the message indicating the content of the second notification information, the user can check the message thereafter. Second, in a case in which the state changes to the predetermined state described above multiple times, the user can collectively check respective messages corresponding to the multiple changes at a time. For example, it is assumed that the user places the portable terminal 30 on the non-contact charging unit 22, and the user starts to drive the vehicle after the non-contact charging unit 22 starts to charge the portable terminal 30. In this case, after finishing the driving (for example, at the time of parking), the user can collectively check the number of times when the state related to charging performed by the non-contact charging unit 22 changes to the predetermined state described above, a time of each change, and content of each change by checking the log.

The following describes the content of the "predetermined state" described above in detail. The predetermined state may be any of the following five types of states, or may be a combination of two or more of the five types of states, for example. The five types of states may include "a state in which charging is (forcibly) finished" (hereinafter, referred to as a "charging finished state" in some cases), "a state in which charging is (forcibly) temporarily stopped" (hereinafter, referred to as a "charging temporary stop state" in some cases), "a state in which a charging speed is reduced" (hereinafter, referred to as a "charging speed reduced state" in some cases), "a state in which a frequency for charging is (forcibly) changed" (hereinafter, referred to as a "frequency changed state" in some cases), and "a state in which an operation performed by the user is detected to be invalid" (hereinafter, referred to as an "invalid operation detected state" in some cases).

The "charging finished state" may be, for example, a state in which the charging is forcibly finished under control by the charge control unit 116 when at least one of predetermined finish conditions (for example, the following "condition A1" to "condition A12") is satisfied after the non-contact charging unit 20 starts to charge the portable terminal 30.

Condition A1: The non-contact charging unit 20 detects presence of a foreign object that may influence non-contact charging (for example, an IC card, a coin, or another electronic appliance)

Condition A2: The non-contact charging unit 20 detects misregistration of the portable terminal 30 with respect to the non-contact charging unit 20

Condition A3: The portable terminal 30 is fully charged

Condition A4: The portable terminal 30 and the like detect that an internal state of the portable terminal 30 is an abnormal state Condition A5: The portable terminal 30 and the like detect that something is broken in the portable terminal 30

Condition A6: The portable terminal 30 and the like detect that a temperature of the portable terminal 30 is increased to a temperature equal to or higher than a predetermined threshold Condition A7: The charging device 9 and the like detect that a temperature of the charging device 9 (or only the non-contact charging unit 20) is increased to a temperature equal to or higher than a predetermined threshold Condition A8: The charging device 9 detects that something is broken in the charging device 9 (or only the non-contact charging unit 20)

Condition A9: It is detected that a version of the predetermined communication method based on wireless power transfer described above (for example, a version of Qi standard) mounted on the portable terminal 30 is a version incompatible with the non-contact charging unit 20

Condition A10: The vehicle is compatible with a smart key, and for example, the ECU and the like in the vehicle detect that connection of the smart key is disconnected Condition A11: The power supply of the charging device 9 is switched from ON to OFF Condition A12: The charging device 9 and the like detect that part of the vehicle-mounted network (for example, part of a LAN) is broken The "charging temporary stop state" may be, for example, a state in which the charging is forcibly and temporarily stopped under control by the charge control unit 116 after the non-contact charging unit 20 starts to charge the portable terminal 30 and during a period in which at least one of predetermined temporary stop conditions (for example, the following "Condition B1" to "Condition B4") is satisfied.

Condition B1: Frequency change is being performed for charging performed by the non-contact charging unit 20

Condition B2: A car audio or a car radio disposed in the compartment 1 is receiving and scanning radio waves of radio broadcasting Condition B3: The vehicle is compatible with a smart key, and communication is being performed by the smart key Condition B4: In a case in which misregistration of the portable terminal 30 with respect to the non-contact charging unit 20 is caused but charging is not stopped, and an amount of the misregistration falls within a rechargeable range, during a period from when the misregistration is caused until recharging is started The "charging speed reduced state" may be, for example, a state in which the charging speed is reduced to a speed equal to or lower than a predetermined threshold after the non-contact charging unit 20 starts to charge the portable terminal 30 because at least one of predetermined factors (for example, the following "Factor C1" to "Factor C3") is generated.

Factor C1: Boost charging is canceled in response to a change of a frequency of a radio during a period in which the charging mode is a boost charging mode Factor C2: During a period in which the charging mode is the boost charging mode, the user performs an operation for changing the frequency for the charging, and the boost charging is canceled in response to the operation Factor C3: In response to a detection that the temperature of the portable terminal 30 increases to be equal to or higher than a predetermined threshold, for example, transmission power of the non-contact charging unit 20 is reduced to be equal to or higher than a predetermined threshold under control by the charge control unit 116

The "frequency changed state" described above may be, for example, a state in which a value of the frequency for charging is changed to a different value after the non-contact charging unit 20 starts to charge the portable terminal 30 because a predetermined factor (for example, the following "Factor D1" or a "Factor D2") is generated.

Factor D1: A frequency of radio broadcasting being received, for example, is changed during the charging Factor D2: The user performs an operation for changing the frequency for charging during the charging The "invalid operation detected state" described above may be, for example, a state in which, after the non-contact charging unit 20 starts to charge the portable terminal 30, the user performs a predetermined operation, but the operation is detected to be invalid (for example, the following "Case E1" to "Case E3").

Case E1: The user performs an operation for changing the frequency for charging during the charging, but the frequency for charging cannot be changed due to influence of a frequency of radio broadcasting, for example Case E2: The user performs an operation for changing the charging mode to the boost charging mode, but the charging mode cannot be shifted to the boost charging mode due to influence of a frequency of radio broadcasting, for example Case E3: The user performs an operation for changing the charging mode to the boost charging mode, but the charging mode cannot be shifted to the boost charging mode because the portable terminal 30 is incompatible with the boost charging mode, for example 1-4-4. Charge Control Unit 116

The charge control unit 116 controls non-contact charging of the portable terminal 30 by the non-contact charging unit 22 in response to the portable terminal 30 being placed on or brought near to the non-contact charging unit 22. For example, in a case in which it is detected that the portable terminal 30 is placed on or brought near to the non-contact charging unit 22, the charge control unit 116 controls the non-contact charging unit 22 to cause the non-contact charging unit 22 to start to charge the portable terminal 30 in a non-contact manner.

Furthermore, the charge control unit 116 can also control the non-contact charging unit 22 to enable various types of communication (for example, reception of the terminal information of the portable terminal 30) using the predetermined communication method based on wireless power transfer (for example, Qi) between the non-contact charging unit 22 and the portable terminal 30 that is placed thereon or brought near thereto.

1-4-5. Display Control Unit 118

The display control unit 118 controls display of information on the display unit 26. For example, the display control unit 118 may control display of information by the display unit 26 based on a detection result of a change of a state related to contact charging of the portable terminal 30 performed by the non-contact charging unit 22 and a determination result obtained by the determination unit 112. More specifically, in a case in which the determination unit 112 determines that the device type of the portable terminal 30 is the specific device type described above, the display control unit 118 may control the display unit 26 so that the information displayed by the display unit 26 is changed depending on the detection result of a change of the state related to the charging.

For example, in a case in which the detection result indicates that the state related to charging performed by the non-contact charging unit 22 changes to the predetermined state described above, the display control unit 118 may cause the display unit 26 to start to display information indicating that the state changes to the predetermined state described above. For example, in a case in which the display unit 26 includes one or more displays, the information may be, for example, a message (for example, a pop-up window) indicating content of the second notification information described above, or another type of character string or image indicating that the state changes to the predetermined state described above. Alternatively, in a case in which the display unit 26 includes one or more LEDs, for example, the information may be displayed such that color of light emitted from the one or more LEDs may become a specific color (different from a light emission color at normal time), luminance of emitted light may become specific luminance (different from luminance at normal time), or the one or more LEDs may blink in a specific blinking pattern.

1-5. Processing Flow

Figure 5:
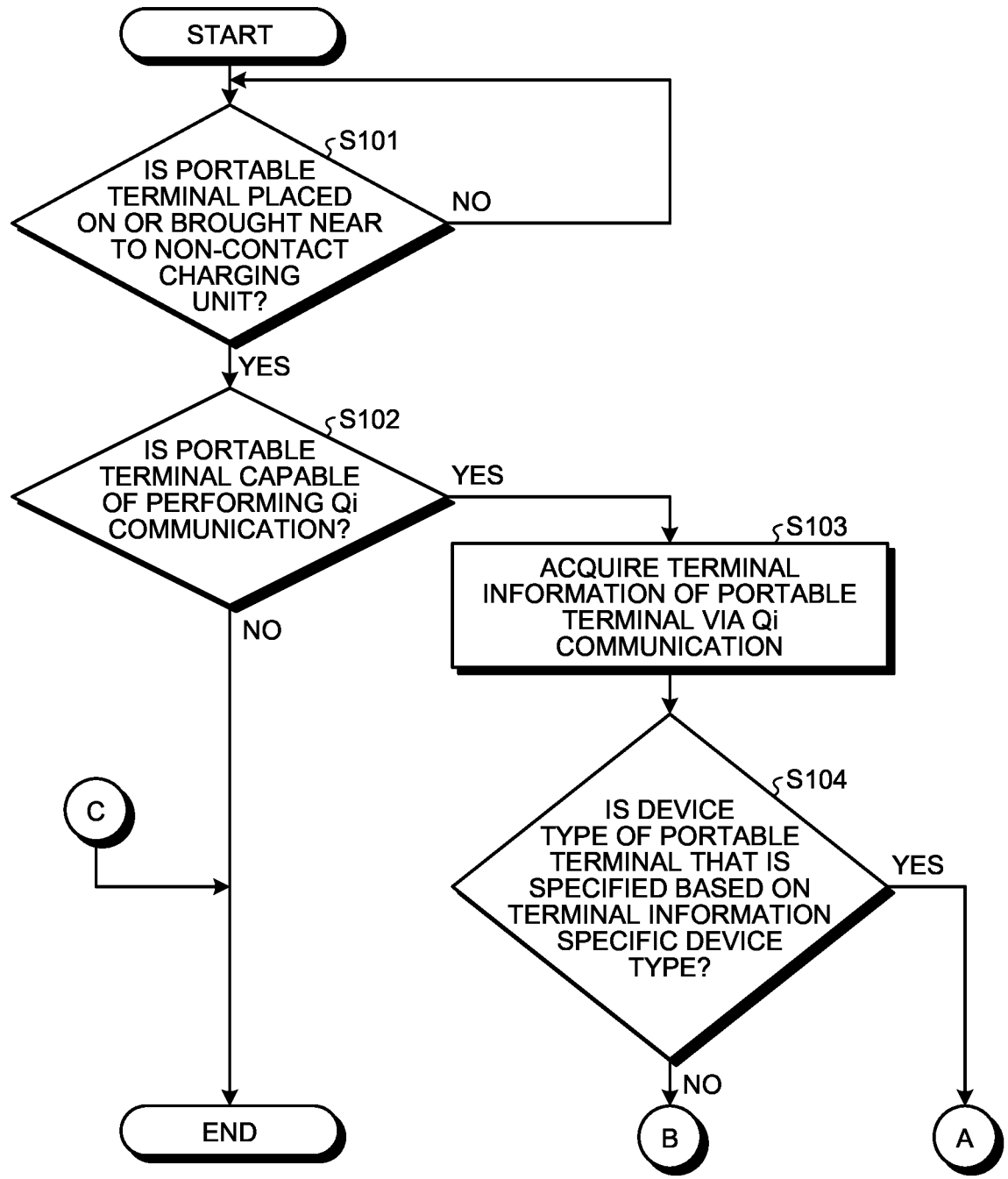
FIG. 5 is a flowchart illustrating part of an example of a processing flow according to the embodiment.
Figure 6:
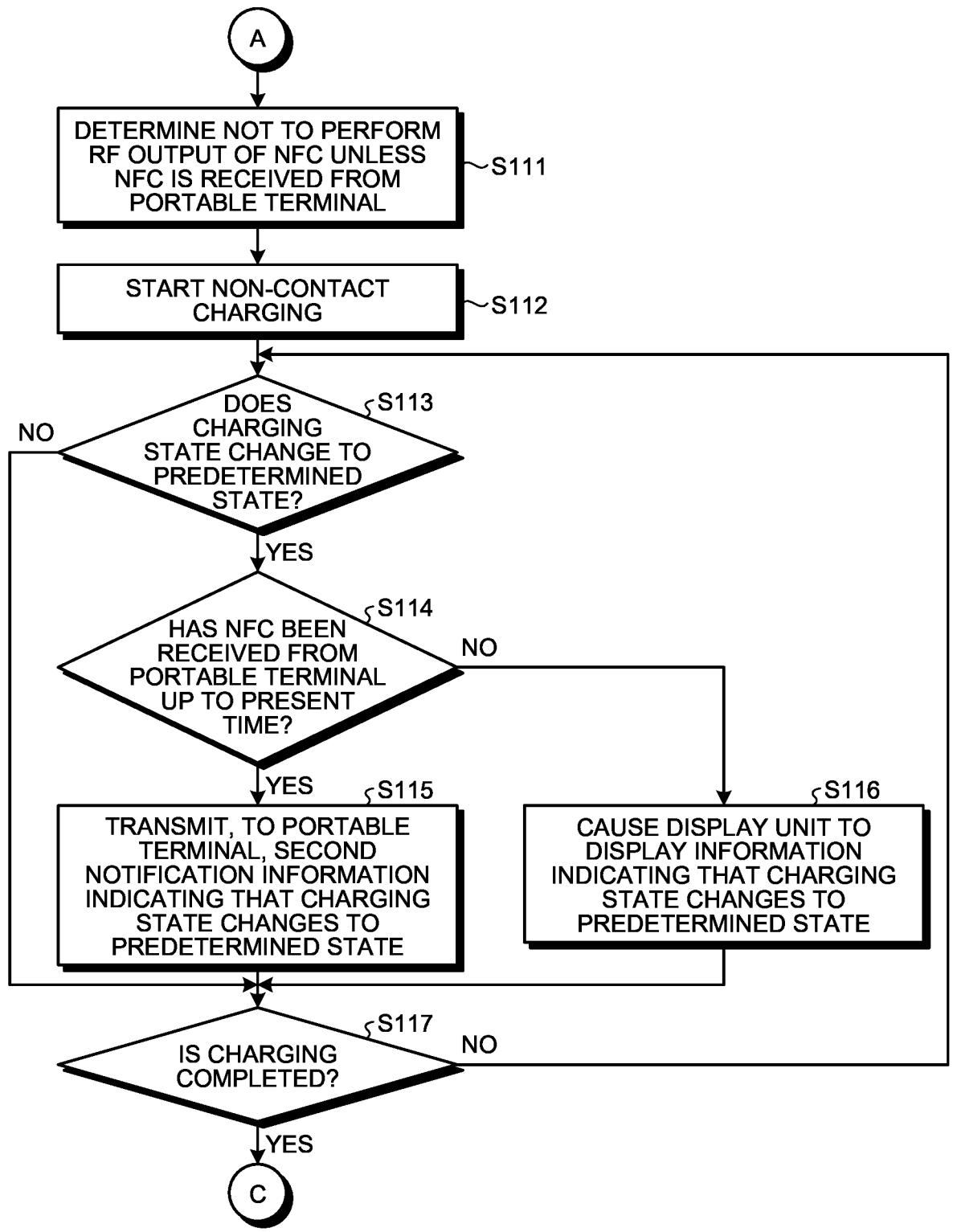
FIG. 6 is a flowchart illustrating part of an example of the processing flow according to the embodiment.
Figure 7:
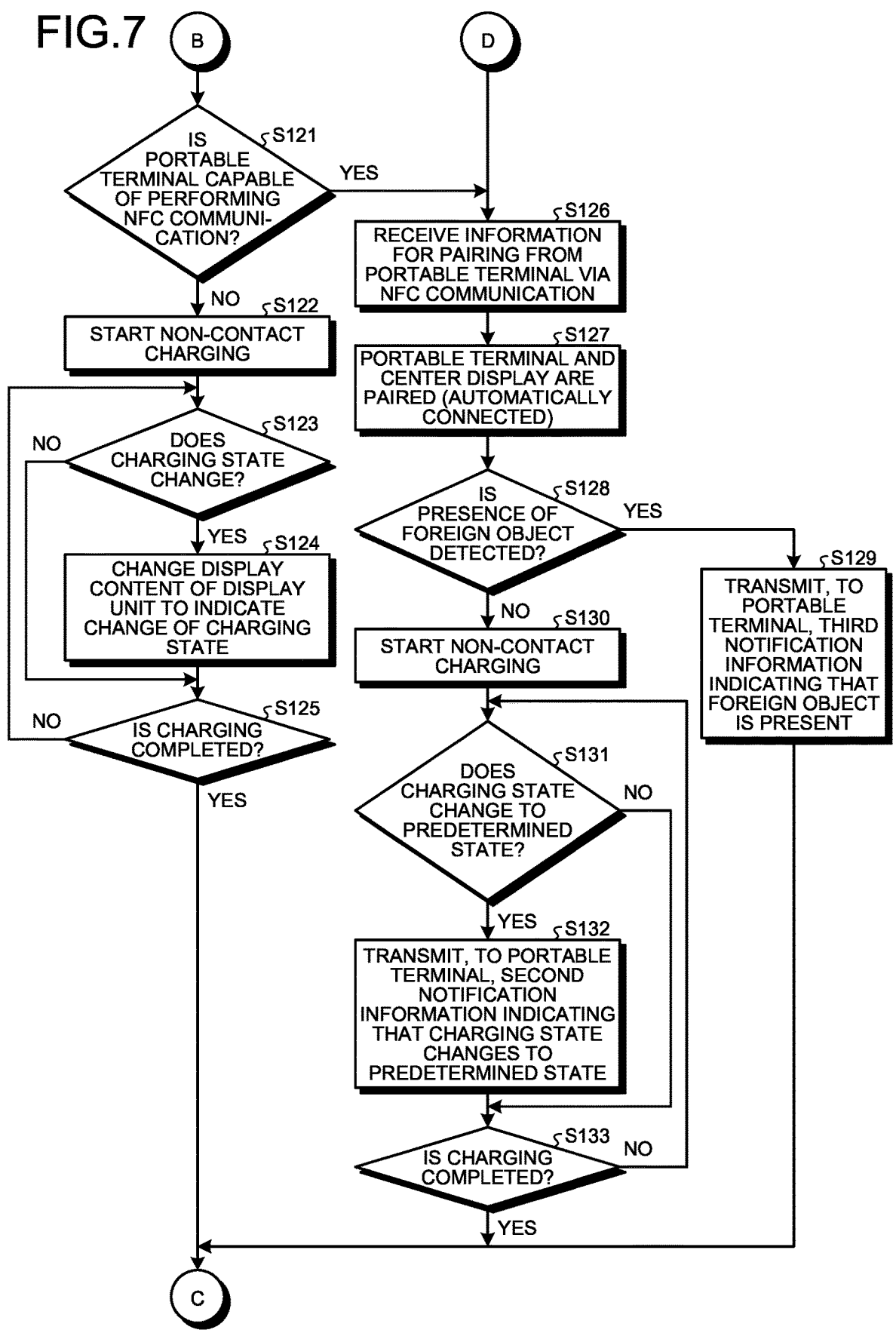
FIG. 7 is a flowchart illustrating part of an example of the processing flow according to the embodiment.

The configuration example of the communication control device 10 has been described above. Next, the following describes a processing flow according to the present embodiment with reference to FIG. 5 to FIG. 7. FIG. 5 to FIG. 7 are flowcharts each illustrating part of the processing flow according to the present embodiment. The following describes an example in which the non-contact charging unit 22 uses a communication method based on Qi standard (hereinafter, referred to as a "Qi communication method") as the predetermined communication method based on wireless power transfer. The following describes an example in which the non-contact communication unit 20 uses a communication method based on NFC (hereinafter, referred to as an "NFC communication method") as the predetermined communication method of short-range wireless communication.

As illustrated in FIG. 5, first, at S101, the non-contact charging unit 22 continuously performs communication based on the Qi communication method under control by the charge control unit 116 to detect whether the portable terminal 30 is placed on or brought near to the non-contact charging unit 22. If it is detected that the portable terminal 30 is not brought into contact with or brought near to the non-contact charging unit 22 (No at S101), S101 is performed again. On the other hand, if it is detected that the portable terminal 30 is placed on or brought near to the non-contact charging unit 22 (Yes at S101), the flow proceeds to S102.

At S102, the charge control unit 116 determines whether the portable terminal 30 detected at S101 can perform communication based on the Qi communication method based on whether a signal is received from the portable terminal 30, content of a received signal, and the like. For example, the charge control unit 116 determines whether the portable terminal 30 is compatible with Qi standard, whether a version of Qi standard mounted on the portable terminal 30 is a version compatible with the non-contact charging unit 20, and the like to determine whether the portable terminal 30 can perform "communication based on the Qi communication method".

If it is determined that the portable terminal 30 can perform the "communication based on the Qi communication method" (Yes at S102), the flow proceeds to S103. On the other hand, if it is determined that the portable terminal 30 cannot perform the "communication based on the Qi communication method" (No at S102), the flow ends.

At S103, the non-contact charging unit 22 performs predetermined communication based on the Qi communication method under control by the charge control unit 116 to receive the terminal information of the portable terminal 30 from the portable terminal 30. The terminal information acquisition unit 110 then receives the terminal information from the non-contact charging unit 22, or acquires the terminal information through read-out processing and the like. Thereafter, the flow proceeds to S104.

At S104, the determination unit 112 determines whether the device type of the portable terminal 30 is the same as the specific device type described above based on the terminal information acquired at S103. As described above, the specific device type described above may be a device type for performing the predetermined processing described above in a case in which information based on the NFC communication method is received from the non-contact communication unit 22 before information based on the NFC communication method is transmitted to the non-contact communication unit 22.

If it is determined that the device type of the portable terminal 30 is the same as the specific device type described above (Yes at S104), the flow proceeds to S111 illustrated in FIG. 6. On the other hand, if it is determined that the device type of the portable terminal 30 is different from the specific device type described above (No at S104), the flow proceeds to S121 illustrated in FIG. 7.

The following describes S111 and the processing flow succeeding thereto according to the present embodiment with reference to FIG. 6. FIG. 6 is a flowchart illustrating part of S111 and the processing flow succeeding thereto. As illustrated in FIG. 6, at S111, the communication control unit 114 determines "not to cause the non-contact communication unit 20 to start to transmit optional information to the portable terminal 30 based on the NFC communication method unless some information based on the NFC communication method is received from the portable terminal 30". The communication control unit 114 then controls the non-contact communication unit 20 based on the determination. That is, the communication control unit 114 does not cause the non-contact communication unit 20 to transmit optional information to the portable terminal 30 based on the NFC communication method. Thereafter, the flow proceeds to S112.

At S112, the non-contact charging unit 22 starts to charge the portable terminal 30 in a non-contact manner under control by the charge control unit 116. The flow then proceeds to S113.

At S113, the non-contact charging unit 22 continuously detects, for example, whether the state related to charging performed by the non-contact charging unit 22 changes to the predetermined state described above. If it is detected that the state related to charging is changed to the predetermined state described above (Yes at S113), the flow proceeds to S114. On the other hand, if it is detected that the state related to charging is not changed to the predetermined state described above (No at S113), the flow proceeds to S117.

At S114, the communication control unit 114 determines whether some information based on the NFC communication method has been received from the portable terminal 30 one or more times up to the present time. If some information based on the NFC communication method has been received from the portable terminal 30 one or more times (Yes at S114), the flow proceeds to S115. On the other hand, if some information based on the NFC communication method has never been received from the portable terminal 30 (No at S114), the flow proceeds to S116.

At S115, the non-contact communication unit 20 transmits, to the portable terminal 30, the second notification information for notifying the user that the state related to charging changes to the predetermined state described above based on the NFC communication method under control by the communication control unit 114. Accordingly, as illustrated in FIG. 4 for example, a message indicating the content of the second notification information is displayed on the display unit 300 of the portable terminal 30. Thereafter, the flow proceeds to S117.

At S116, the display unit 26 displays information indicating that the state related to charging changes to the predetermined state described above under control by the display control unit 118. The flow then proceeds to S117.

At S117, the charge control unit 116 determines whether charging of the portable terminal 30 by the non-contact charging unit 22 is completed. Specific examples of the situation in which the charging is completed include situations in which the power supply of the charging device 9 is switched from ON to OFF, the user moves the portable terminal 30 away from the non-contact charging unit 22 by a predetermined distance or more, or a charging amount of the portable terminal 30 reaches a predetermined charging amount, for example, full charge. If it is determined that the charging is completed (Yes at S117), the flow ends. On the other hand, if it is determined that the charging is not completed (No at S117), the flow proceeds to S113 again.

The following describes S121 and the processing flow succeeding thereto according to the present embodiment with reference to FIG. 7. FIG. 7 is a flowchart illustrating part of S121 and the processing flow succeeding thereto. As illustrated in FIG. 7, at S121, the charge control unit 116 determines whether the portable terminal 30 can perform NFC communication. For example, the charge control unit 116 may determine whether the portable terminal 30 can perform NFC communication based on the terminal information acquired at S103. Alternatively, the non-contact communication unit 20 may transmit some information to the portable terminal 30 based on the NFC communication method under control by the communication control unit 114. In this case, the charge control unit 116 may determine whether the portable terminal 30 can perform NFC communication based on whether a signal (for example, a predetermined signal based on the NFC communication method)

is received from the portable terminal 30 after the information is transmitted, content of a received signal, and the like.

If it is determined that the portable terminal 30 can perform NFC communication (Yes at S121), the flow proceeds to S126. On the other hand, if it is determined that the portable terminal 30 cannot perform NFC communication (No at S121), the flow proceeds to S122.

At S122, the non-contact charging unit 22 starts to charge the portable terminal 30 in a non-contact manner under control by the charge control unit 116. The flow then proceeds to S123.

At S123, the non-contact charging unit 22 continuously detects, for example, whether the state related to charging performed by the non-contact charging unit 22 changes to the predetermined state described above. If it is detected that the state related to charging changes to the predetermined state described above (Yes at S123), the flow proceeds to S124. On the other hand, if it is detected that the state related to charging does not change to the predetermined state described above (No at S123), the flow proceeds to S125.

At S124, the display unit 26 displays information indicating that the state related to charging changes to the predetermined state described above under control by the display control unit 118. The flow then proceeds to S125.

At S125, the charge control unit 116 determines whether charging of the portable terminal 30 by the non-contact charging unit 22 is completed. If it is determined that the charging is completed (Yes at S125), the flow ends. On the other hand, if it is determined that the charging is not completed (No at S125), the flow proceeds to S123 again.

At S126, the non-contact communication unit 20 performs predetermined communication based on the NFC communication method with the portable terminal 30 under control by the communication control unit 114 to receive, from the portable terminal 30, information for pairing (for example, authentication key information) for enabling communication conforming to a predetermined wireless communication standard between a wireless communication device (for example, the center display 7) in the compartment 1 and the portable terminal 30. The predetermined wireless communication standard may be, for example, Bluetooth (registered trademark) or Wi-Fi (registered trademark). Thereafter, the flow proceeds to S127.

At S127, the communication unit 24 transmits the information for pairing received at S126 to the wireless communication device under control by the communication control unit 114. Accordingly, the wireless communication device and the portable terminal 30 may be connected with each other (pairing may be executed) to enable communication conforming to the predetermined wireless communication standard. The flow then proceeds to S128.

At S128, the communication control unit 114 (or the non-contact communication unit 20) determines whether the non-contact communication unit 20 has detected presence of a response of NFC from other than the portable terminal 30, and based on a determination result of the determination, determines presence of a foreign object that may influence non-contact charging. For example, in a case in which the non-contact communication unit 20 detects a larger number of responses of NFC than a "corresponding number of NFC of the portable terminal 30" that is specified based on the terminal information acquired at S103, the communication control unit 114 (or the non-contact communication unit 20) determines that a response of NFC from other than the portable terminal 30 is present. That is, in this case, the communication control unit 114 (or the non-contact communication unit 20) determines that a foreign object is present. Alternatively, in a case in which the non-contact communication unit 20 detects a response of NFC of a type different from a "corresponding type of NFC of the portable terminal 30" that is specified based on the terminal information acquired at S103, the communication control unit 114 (or the non-contact communication unit 20) determines that a response of NFC from other than the portable terminal 30 is present. That is, in this case, the communication control unit 114 (or the non-contact communication unit 20) determines that a foreign object is present.

If it is determined that the foreign object is present (Yes at S128), the flow proceeds to S129. On the other hand, if it is determined that the foreign object is not present (No at S128), the flow proceeds to S130.

At S129, the non-contact communication unit 20 transmits, to the portable terminal 30, third notification information for notifying the user that the foreign object is present under control by the communication control unit 114. Accordingly, a message for notifying the user of presence of the foreign object is displayed on the display unit 300 of the portable terminal 30. Thereafter, the flow ends.

At S130, the non-contact charging unit 22 starts to charge the portable terminal 30 in a non-contact manner under control by the charge control unit 116. The flow then proceeds to S131.

At S131, the non-contact charging unit 22 continuously detects, for example, whether the state related to charging performed by the non-contact charging unit 22 changes to the predetermined state described above. If it is detected that the state related to charging changes to the predetermined state (Yes at S131), the flow proceeds to S132. On the other hand, if it is detected that the state related to charging does not change to the predetermined state described above (No at S131), the flow proceeds to S133.

At S132, the non-contact communication unit 20 transmits, to the portable terminal 30, the second notification information described above for notifying the user that the state related to charging changes to the predetermined state described above under control by the communication control unit 114. Accordingly, as illustrated in FIG. 4 for example, a message indicating content of the second notification information is displayed on the display unit 300 of the portable terminal 30. Thereafter, the flow proceeds to S133.

At S133, the charge control unit 116 determines whether charging of the portable terminal 30 by the non-contact charging unit 22 is completed. If it is determined that the charging is completed (Yes at S133), the flow ends. On the other hand, if it is determined that the charging is not completed (No at S133), the flow proceeds to S131 again.

1-6. Effects

As described above, according to the present embodiment, the communication control device 10 acquires the terminal information of the portable terminal 30 that is placed on or brought near to the non-contact charging unit 22 via communication based on the predetermined communication method based on wireless power transfer, and controls transmission of the information to the portable terminal 30 by the non-contact communication unit 20 based on the device type of the portable terminal 30 based on the acquired terminal information. Accordingly, it is possible to appropriately control transmission of the information to the portable terminal 30 based on the predetermined communication method of short-range wireless communication in accordance with the device type of the portable terminal 30.

For example, if it is determined that the device type of the portable terminal 30 is the specific device type described above, the communication control device 10 controls the non-contact communication unit 20 to cause the non-contact communication unit 20 not to start to transmit the information to the portable terminal 30 based on the predetermined communication method of short-range wireless communication. Accordingly, the communication control device 10 can prevent the non-contact communication unit 20 from starting to transmit the information to the portable terminal 30 based on the predetermined communication method of short-range wireless communication unless some information based on the predetermined communication method of short-range wireless communication is received from the portable terminal 30. Thus, unlike the well-known technique described above with reference to FIG. 3B, according to the present embodiment, the portable terminal 30 can be prevented from automatically performing the predetermined processing described above (for example, display processing of a screen of a predetermined payment application). As a result, the user who is using the portable terminal 30 can be prevented from misunderstanding that the predetermined processing will be automatically performed.

1-7. Hardware Configuration

Figure 8:
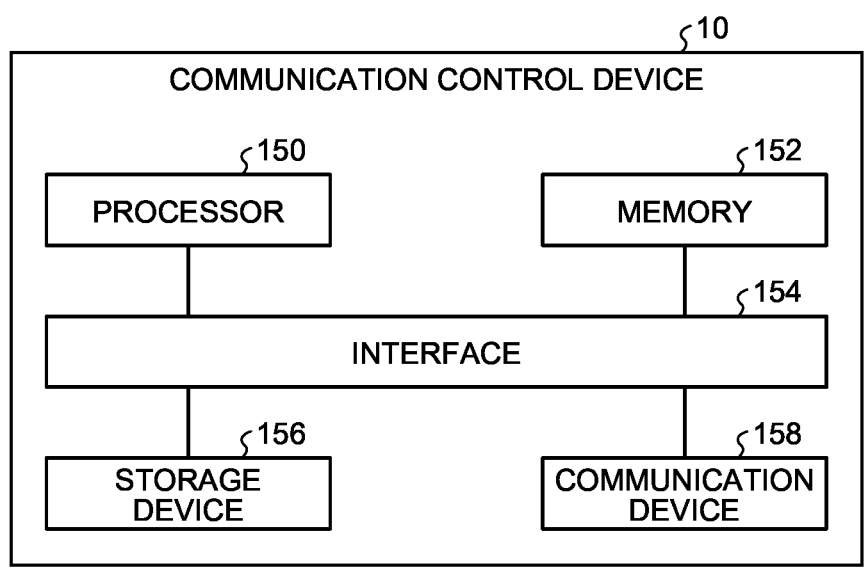
FIG. 8 is a diagram illustrating an example of a hardware configuration of a communication control device 10 according to the embodiment.

Next, the following describes an example of a hardware configuration of the communication control device 10 according to the present embodiment. FIG. 8 is a diagram illustrating an example of the hardware configuration of the communication control device 10. As illustrated in FIG. 8, the communication control device 10 may include the processor 150, the memory 152, an interface 154, a storage device 156, and a communication device 158.

The processor 150 functions as an arithmetic processing device and a control device, and controls the entire operation in the communication control device 10 in accordance with various computer programs. The processor 150 may implement the function of the control unit 100 in the communication control device 10. The processor 150 may include, for example, processing circuits such as one or more central processing units (CPUs) and one or more graphics processing units (CPUs).

The memory 152 stores, for example, a computer program used by the processor 150, data for control such as arithmetic parameters, and the like. The memory 152 includes, for example, one or more read only memories (ROMs), one or more random access memories (RAMs), and the like.

The interface 154 includes, for example, a CPU bus and the like. The interface 154 may connect the processor 150, the memory 152, the storage device 156, and the communication device 158 with each other.

The storage device 156 is, for example, a device for storing data such as a hard disk drive (HDD) and the like. The storage device 156 includes, for example, a storage medium, a recording device that records data in the storage medium, a reading device that reads out data from the storage medium, a deletion device that deletes data recorded in the storage medium, or the like.

The communication device 158 is a communication interface constituted of a communication device and the like for making a connection with a communication network such as the Internet via wired communication or wireless communication, for example. The communication device 158 may be a communication device compatible with a wireless LAN, a communication device compatible with Long Term Evolution (LTE), or a wire communication device that performs communication in a wired manner.

2. Modifications

The preferred embodiment of the present disclosure has been described above in detail with reference to the attached drawings, but the present disclosure is not limited thereto. It is obvious that those ordinarily skilled in the art of the present disclosure may conceive various examples of variations or modifications within a scope of the technical idea described in CLAIMS, and these are obviously encompassed by the technical scope of the present disclosure. For example, four types of modifications described below (specifically, "first modification" to "fourth modification") may be encompassed by the technical scope of the present disclosure. The same content as that in the embodiment described above will not be repeated.

2-1. First Modification

2-1-1. Configuration

First, the following describes a first modification. The first modification is different from the embodiment described above in the function of the communication control unit 114. In a case in which the determination unit 112 determines that the device type of the portable terminal 30 is the specific device type described above, the communication control unit 114 according to the first modification may cause the non-contact communication unit 20 to transmit, to the portable terminal 30, first notification information for notifying the user of the portable terminal 30 that the predetermined processing described above is not performed.

Figure 9:
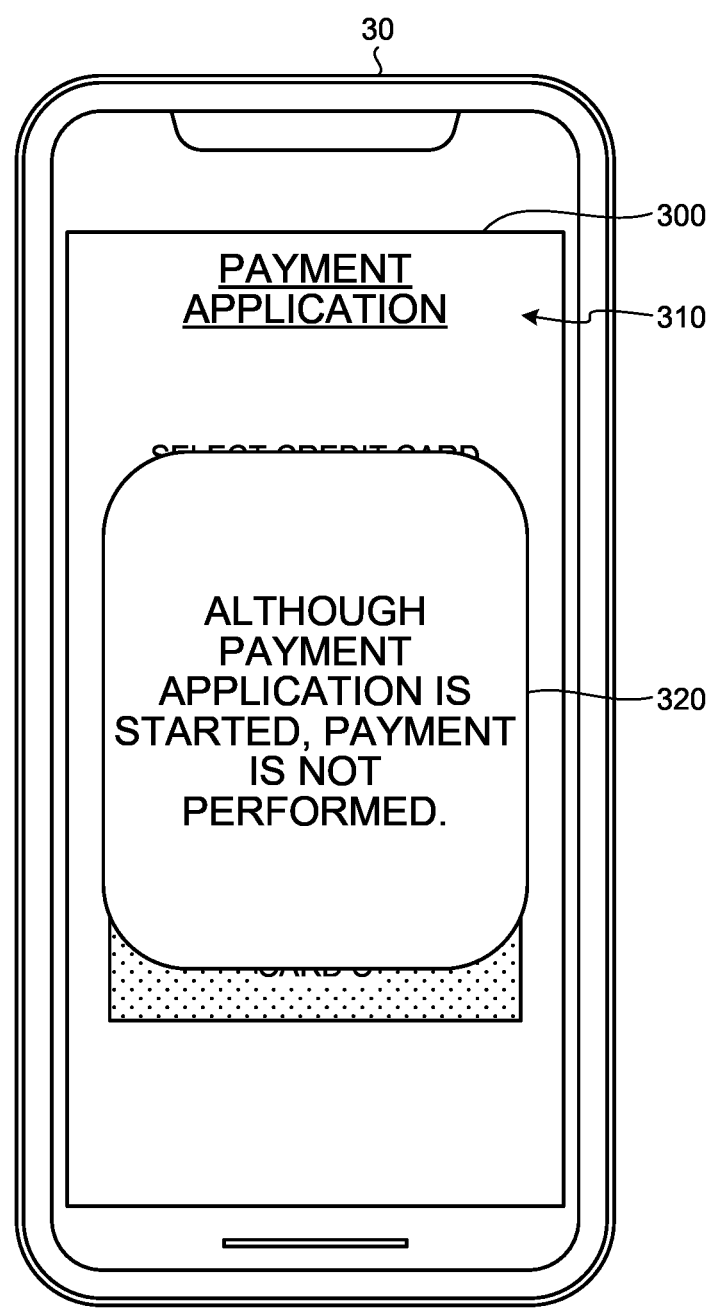
FIG. 9 is a diagram illustrating a display example of a message 320 at the time when the screen of the payment application is displayed on the portable terminal 30 according to a modification of the embodiment.

In this case, the first notification information is notification information corresponding to the predetermined processing described above. For example, in a case in which the predetermined processing is processing related to the predetermined payment described above (for example, processing related to display control for information related to the predetermined payment), the first notification information may include a character string for notifying the user that the processing related to the predetermined payment is not automatically performed such as "although the payment application is started, payment is not performed", for example. In this case, when the first notification information is transmitted to the portable terminal 30, first, the portable terminal 30 may automatically perform the predetermined processing described above. As in the display example illustrated in FIG. 9, for example, a screen of the predetermined payment application is automatically displayed on the display unit 300 of the portable terminal 30, and a message 320 indicating the content of the first notification information (for example, a pop-up window) may be displayed to be superimposed on the application screen. FIG. 9 is a diagram illustrating the display example of the image on the display unit 300 of the portable terminal 30 at the time when the first notification information is transmitted to the portable terminal 30.

In this way, according to the present modification, at the time when the display screen corresponding to the predetermined processing described above (for example, the screen of the predetermined payment application described above) is automatically displayed on the display unit 300 of the portable terminal 30, the message indicating the content of the first notification information may be automatically displayed (for example, at the same time). Accordingly, the user can be notified that the predetermined processing described above is not automatically performed. That is, (unlike the well-known technique described above with reference to FIG. 3B), the user who is using the portable terminal 30 can be prevented from misunderstanding that the predetermined processing will be automatically performed.

2-1-2. Processing Flow

The configuration according to the first modification has been described above. Next, the following describes a processing flow according to the first modification. Description about the same content as the processing flow described in the section 1-4 will not be repeated.

Figure 10:
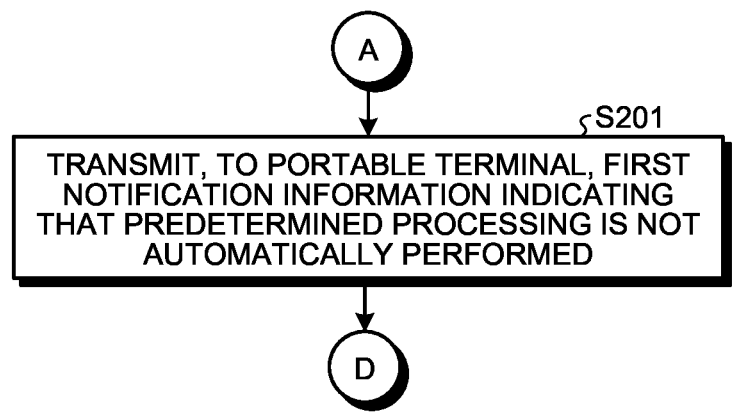
FIG. 10 is a flowchart illustrating part of a processing flow according to the modification.

In the first modification, at S104 (illustrated in FIG. 5), if it is determined that the device type of the portable terminal 30 is the specific device type described above (Yes at S104), the processing flow proceeds to S201 illustrated in FIG. 10 (instead of proceeding to S111 illustrated in FIG. 6). FIG. 10 is a flowchart illustrating part of the processing flow according to the first modification.

As illustrated in FIG. 10, at S201, the non-contact communication unit 20 transmits, to the portable terminal 30, the first notification information for notifying the user that the predetermined processing described above is not automatically performed (based on the predetermined communication method of short-range wireless communication) under control by the communication control unit 114. Accordingly, the portable terminal 30 may automatically perform the predetermined processing described above by receiving the first notification information. As in the display example illustrated in FIG. 9, for example, the display screen corresponding to the predetermined processing described above (for example, the screen of the predetermined payment application described above) is automatically displayed on the display unit 300 of the portable terminal 30, and the message indicating the content of the first notification information may be automatically displayed at the same time, for example.

Thereafter, the processing flow proceeds to S126 (illustrated in FIG. 7). The processing at S126 and processing succeeding thereto are the same as those in the embodiment described above, so that description thereof will not be repeated. The first modification has been described above.

2-2. Second Modification

Next, the following describes a second modification. In the embodiment described above, as illustrated in FIG. 2, described is the example in which the charging device 9 (that is, one device) includes all of the communication control device 10, the non-contact communication unit 20, the non-contact charging unit 22, the communication unit 24, and the display unit 26, but the present disclosure is not limited to this example. For example, each of the non-contact communication unit 20, the non-contact charging unit 22, the communication unit 24, and the display unit 26 may be configured as a communication control system that can transmit/receive data to/from the communication control device 10. For example, the display unit 26 may be configured integrally with the center display 7 or the meter panel 5 described above, or another display (for example, a Head Up Display (HUD) or an electron mirror) that may be disposed in the compartment 2. Any one of these displays may be the same as the display unit 26.

2-3. Third Modification

Next, the following describes a third modification. In the embodiment described above, described is the example in which the determination unit 112 determines whether the device type of the portable terminal 30 is the specific device type described above, but the present disclosure is not limited to this example. As a modification, this determination can be performed by an external device of the communication control device 10, and the communication control device 10 can receive a determination result of the determination from the external device. The external device may be one or more devices (for example, an ECU) connected to a vehicle-mounted network in a corresponding vehicle, or may be an external device of the vehicle (for example, a server or another vehicle).

Specifically, first, the communication unit 24 may transmit an inquiry request for the device type corresponding to the terminal information acquired by the terminal information acquisition unit 110 to the external device of the communication control device 10 via the predetermined network under control by the communication control unit 114. In this case, when the external device receives the inquiry request, the external device may determine whether the device type of the portable terminal 30 is the specific device type described above based on the inquiry request. Next, the external device generates an answer to the inquiry request so that a determination result of the determination is included therein. The answer may be transmitted to the communication control device 10 via the predetermined network. In a case in which the communication unit 24 receives the answer, the communication control unit 114 may specify whether the device type of the portable terminal 30 is the specific device type described above based on the answer. In this modification, the control unit 100 does not necessarily include but may include the determination unit 112.

In the processing flow according to the third modification, only the content of S104 illustrated in FIG. 5 may be different from that in the processing flow described above in the section 1-4. Specifically, at S104 according to the third modification, as described above, the external device that has received the inquiry request may determine whether the device type of the portable terminal 30 is the same as the specific device type described above. The communication control device 10 may receive the answer including a determination result of the determination from the external device via the predetermined network described above. Thereafter, similarly to the embodiment described above, the processing flow proceeds to S111 or S121 based on the determination result.

2-4. Fourth Modification

Next, the following describes a fourth modification. The content of S115 described above with reference to FIGS. 6, S129 and S132 described above with reference to FIG. 7, and the like are not limited to the example described above. As a modification, at S115, the non-contact communication unit 20 may transmit the second notification information described above to the portable terminal 30, and the display unit 26 may display information indicating that the state related to charging changes to the predetermined state described above under control by the display control unit 118 at the same time. Thereafter, the processing flow may proceed to S117 described above.

As a modification, at S132, the non-contact communication unit 20 may transmit the second notification information described above to the portable terminal 30 under control by the communication control unit 114, and the display unit 26 may display the information indicating that the state related to charging changes to the predetermined state described above under control by the display control unit 118 at the same time. Thereafter, the processing flow may proceed to S133 described above.

As a modification, at S129, the non-contact communication unit 20 may transmit the third notification information described above for notifying that a foreign object is present to the portable terminal 30 under control by the communication control unit 114, and the display unit 26 may display information indicating that the foreign object is present under control by the display control unit 118. Thereafter, the processing flow may end.

The following aspects may be encompassed by the technical scope of the present disclosure.

(1)
A communication control device including
an acquisition unit configured to acquire, via communication based on a first non-contact communication method, terminal information of a portable terminal capable of being charged in a non-contact manner, the portable terminal being placed on or brought near to a non-contact charging unit disposed in a compartment of a vehicle; and
a communication control unit configured to control, based on a device type of the portable terminal based on the terminal information acquired by the acquisition unit, transmission of information to the portable terminal by a non-contact communication unit that is disposed in the vehicle in association with the non-contact charging unit and capable of performing communication based on a second non-contact communication method, may be provided.

(2)
The communication control unit may be configured to control transmission of information to the portable terminal by the non-contact communication unit based on whether it is determined that the device type of the portable terminal is a predetermined device type.

(3)
The communication control unit may be configured to, in a case in which it is determined that the device type of the portable terminal is the predetermined device type, control the non-contact communication unit to cause the non-contact communication unit not to start to transmit information to the portable terminal based on the second non-contact communication method.

(4)
The communication control unit may be configured to, in a case in which it is determined that the device type of the portable terminal is not the predetermined device type, control the non-contact communication unit to enable the non-contact communication unit to start to transmit information to the portable terminal based on the second non-contact communication method.

(5)
The predetermined device type may be a device type that performs predetermined processing when receiving information based on the second non-contact communication method from the non-contact communication unit before transmitting information based on the second non-contact communication method to the non-contact communication unit.

(6)
The communication control unit may be configured to, in a case in which it is determined that the device type of the portable terminal is the predetermined device type, control the non-contact communication unit to transmit, to the portable terminal, first notification information for notifying a user of the portable terminal that the predetermined processing is not performed.

(7)
The predetermined processing may be processing related to predetermined payment.

(8)
The communication may further include a charge control unit configured to control non-contact charging of the portable terminal by the non-contact charging unit in response to the portable terminal being placed on or brought near to the non-contact charging unit.

(9)
The communication control unit may be configured to, after the non-contact charging unit starts to perform non-contact charging of the portable terminal, control the non-contact communication unit to transmit, to the portable terminal, second notification information for notifying the user of the portable terminal of information corresponding to a detection result of a change of a state related to the non-contact charging, based on the device type of the portable terminal and the detection result.

(10)
The predetermined device type may be a device type that performs predetermined processing when receiving information based on the second non-contact communication method from the non-contact communication unit before transmitting information based on the second non-contact communication method to the non-contact communication unit, and
the communication control unit may be configured to control the non-contact communication unit to transmit the second notification information to the portable terminal in a case in which it is determined that the device type of the portable terminal is not the predetermined device type, and the detection result indicates that the state related to non-contact charging changes to a predetermined state.

(11)
The predetermined device type may be a device type that performs predetermined processing when receiving information based on the second non-contact communication method from the non-contact communication unit before transmitting information based on the second non-contact communication method to the non-contact communication unit, and
the communication control unit may be configured to control the non-contact communication unit to transmit the second notification information to the portable terminal irrespective of whether the device type of the portable terminal is the predetermined device type in a case in which the information based on the second non-contact communication method is received from the portable terminal before the non-contact communication unit starts to transmit information based on the second non-contact communication method to the portable terminal, and the detection result indicates that the state related to non-contact charging changes to a predetermined state.

(12)
The information corresponding to the detection result may be information indicating that the state related to non-contact charging changes to the predetermined state.

(13)
The communication control unit may be configured to, in a case in which it is determined that a foreign object capable of influencing non-contact charging is present in a vicinity of the non-contact charging unit, control transmission of third notification information for notifying the user of the portable terminal that the foreign object is present to the portable terminal by the non-contact communication unit based on the device type of the portable terminal.

(14)
The predetermined device type may be a device type that performs predetermined processing when receiving information based on the second non-contact communication method from the non-contact communication unit before transmitting information based on the second non-contact communication method to the non-contact communication unit, and
the communication control unit may be configured to control the non-contact communication unit to transmit the third notification information to the portable terminal in a case in which it is determined that the device type of the portable terminal is not the predetermined device type, and it is determined that the foreign object is present in the vicinity of the non-contact charging unit.

(15)

The second non-contact communication method may be a communication method based on Near Field Communication (NFC), and the communication control unit may be configured to determine whether the non-contact communication unit has detected presence of a response of the NFC from other than the portable terminal, and, based on a determination result thereof, determine whether the foreign object is present in the vicinity of the non-contact charging unit.

(16)

The communication control device may further includes a display control unit configured to control display of information by a display unit that is disposed in the compartment in association with the non-contact charging unit based on whether it is determined that the device type of the portable terminal is a predetermined device type and a detection result of a change of the state related to non-contact charging.

(17)

The predetermined device type may be a device type that performs predetermined processing when receiving information based on the second non-contact communication method from the non-contact communication unit before transmitting information based on the second non-contact communication method to the non-contact communication unit, and the display control unit may be configured to control the display unit such that information displayed by the display unit is changed depending on a detection result of a change of the state related to non-contact charging in a case in which it is determined that the device type of the portable terminal is the predetermined device type.

(18)

The second non-contact communication method may be a predetermined communication method based on short-range wireless communication.

(19)

The first non-contact communication method may be a predetermined communication method based on wireless power transfer.

(20)

The communication control device may further include a determination unit configured to determine whether the device type of the portable terminal is a predetermined device type based on the terminal information acquired by the acquisition unit, and the communication control unit may be configured to control transmission of information to the portable terminal by the non-contact communication unit based on a determination result obtained by the determination unit.

(21)

The communication control unit may be configured to control a communication unit to transmit an inquiry request for a device type corresponding to the terminal information acquired by the acquisition unit to an external device of the communication control device via a network, and the communication control unit may be configured to, in a case in which the communication unit receives an answer to the inquiry request from the external device, control transmission of information to the portable terminal by the non-contact communication unit based on a device type of the portable terminal, the device type being specified based on the answer.

(22)

A communication control system including:

an acquisition unit configured to acquire, via communication based on a first non-contact communication method, terminal information of a portable terminal capable of being charged in a non-contact manner, the portable terminal being placed on or brought near to a non-contact charging unit disposed in a compartment of a vehicle; and a communication control unit configured to control, based on a device type of the portable terminal based on the terminal information acquired by the acquisition unit, transmission of information to the portable terminal by a non-contact communication unit that is disposed in the vehicle in association with the non-contact charging unit and capable of performing communication based on a second non-contact communication method, may be provided.

(23)

The communication control system may further includes a charge control unit configured to control non-contact charging of the portable terminal by the non-contact charging unit in response to the portable terminal being placed on or brought near to the non-contact charging unit.

(24)

The communication control system may further include:

the non-contact charging unit; and the non-contact communication unit.

(25)

A communication control method performed by a communication control device, the communication control method including:

acquiring, via communication based on a first non-contact communication method, terminal information of a portable terminal capable of being charged in a non-contact manner, the portable terminal being placed on or brought near to a non-contact charging unit disposed in a compartment of a vehicle; and controlling, based on a device type of the portable terminal based on the acquired terminal information, transmission of information to the portable terminal by a non-contact communication unit that is disposed in the vehicle in association with the non-contact charging unit and capable of performing communication based on a second non-contact communication method, may be provided As described above, according to the present disclosure, it is possible to appropriately control communication with the portable terminal based on the non-contact communication method depending on the device type of the portable terminal that is placed on or brought near to the non-contact charging unit. The effect described herein is not a limitation, and any of the effects described in the present disclosure may be exhibited.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication control device comprising:
a memory; and
a hardware processor coupled to the memory, the hardware processor being configured to:
acquire, via communication based on a first non-contact communication method, terminal information of a portable terminal capable of being charged in a non-contact manner, the portable terminal being placed on or brought near to a non-contact charger disposed in a compartment of a vehicle; and
control, based on a device type of the portable terminal based on the terminal information acquired by the acquisition unit, transmission of information to the portable terminal by a non-contact communicator that is disposed in the vehicle in association with the non-contact charger and capable of performing communication based on a second non-contact communication method.

2. The communication control device according to claim 1, wherein the hardware processor is configured to control transmission of information to the portable terminal by the non-contact communicator based on whether it is determined that the device type of the portable terminal is a predetermined device type.

3. The communication control device according to claim 2, wherein the hardware processor is configured to, in a case in which it is determined that the device type of the portable terminal is the predetermined device type, control the non-contact communicator to cause the non-contact communicator not to start to transmit information to the portable terminal based on the second non-contact communication method.

4. The communication control device according to claim 2, wherein the hardware processor is configured to, in a case in which it is determined that the device type of the portable terminal is not the predetermined device type, control the non-contact communicator to enable the non-contact communicator to start to transmit information to the portable terminal based on the second non-contact communication method.

5. The communication control device according to claim 2, wherein the predetermined device type is a device type that performs predetermined processing when receiving information based on the second non-contact communication method from the non-contact communicator before transmitting information based on the second non-contact communication method to the non-contact communicator.

6. The communication control device according to claim 5, wherein the hardware processor is configured to, in a case in which it is determined that the device type of the portable terminal is the predetermined device type, control the non-contact communicator to transmit, to the portable terminal, first notification information for notifying a user of the portable terminal that the predetermined processing is not performed.

7. The communication control device according to claim 5, wherein the predetermined processing is processing related to predetermined payment.

8. The communication control device according to claim 2, wherein the hardware processor is further configured to control non-contact charging of the portable terminal by the non-contact charger in response to the portable terminal being placed on or brought near to the non-contact charger.

9. The communication control device according to claim 8, wherein the hardware processor is configured to, in a case in which it is determined that a foreign object capable of influencing non-contact charging is present in a vicinity of the non-contact charger, control transmission of third notification information for notifying the user of the portable terminal that the foreign object is present to the portable terminal by the non-contact communicator based on the device type of the portable terminal.

10. The communication control device according to claim 9, wherein
the predetermined device type is a device type that performs predetermined processing when receiving information based on the second non-contact communication method from the non-contact communicator before transmitting information based on the second non-contact communication method to the non-contact communicator, and
the hardware processor is configured to control the non-contact communicator to transmit the third notification information to the portable terminal in a case in which it is determined that the device type of the portable terminal is not the predetermined device type, and it is determined that the foreign object is present in the vicinity of the non-contact charger.

11. The communication control device according to claim 9, wherein
the second non-contact communication method is a communication method based on Near Field Communication (NFC), and
the hardware processor is configured to determine whether the non-contact communicator has detected presence of a response of the NFC from other than the portable terminal, and, based on a determination result thereof, determine whether the foreign object is present in the vicinity of the non-contact charger.

12. The communication control device according to claim 2, wherein the hardware processor is configured to, after the non-contact charger starts to perform non-contact charging of the portable terminal, control the non-contact communicator to transmit, to the portable terminal, second notification information for notifying the user of the portable terminal of information corresponding to a detection result of a change of a state related to the non-contact charging, based on the device type of the portable terminal and the detection result.

13. The communication control device according to claim 12, wherein
the predetermined device type is a device type that performs predetermined processing when receiving information based on the second non-contact communication method from the non-contact communicator before transmitting information based on the second non-contact communication method to the non-contact communicator, and
the hardware processor is configured to control the non-contact communicator to transmit the second notification information to the portable terminal in a case in which it is determined that the device type of the portable terminal is not the predetermined device type, and the detection result indicates that the state related to non-contact charging changes to a predetermined state.

14. The communication control device according to claim 12, wherein
the predetermined device type is a device type that performs predetermined processing when receiving information based on the second non-contact communication method from the non-contact communicator before transmitting information based on the second non-contact communication method to the non-contact communicator, and the hardware processor is configured to control the non-contact communicator to transmit the second notification information to the portable terminal irrespective of whether the device type of the portable terminal is the predetermined device type in a case in which information based on the second non-contact communication method is received from the portable terminal before the non-contact communicator starts to transmit information based on the second non-contact communication method to the portable terminal, and the detection result indicates that the state related to non-contact charging changes to a predetermined state.

15. The communication control device according to claim 13, wherein the information corresponding to the detection result is information indicating that the state related to non-contact charging changes to the predetermined state.

16. The communication control device according to claim 1, wherein the hardware processor is further configured to control display of information by a display that is disposed in the compartment in association with the non-contact charger based on whether it is determined that the device type of the portable terminal is a predetermined device type and a detection result of a change of the state related to non-contact charging.

17. A communication control system comprising:
a memory; and
a hardware processor coupled to the memory, the hardware processor being configured to:
acquire, via communication based on a first non-contact communication method, terminal information of a portable terminal capable of being charged in a non-contact manner, the portable terminal being placed on or brought near to a non-contact charger disposed in a compartment of a vehicle; and
control, based on a device type of the portable terminal based on the terminal information acquired by the acquisition unit, transmission of information to the portable terminal by a non-contact communicator that is disposed in the vehicle in association with the non-contact charger and capable of performing communication based on a second non-contact communication method.

18. The communication control system according to claim 17, wherein the hardware processor is further configured to control non-contact charging of the portable terminal by the non-contact charger in response to the portable terminal being placed on or brought near to the non-contact charger.

19. The communication control system according to claim 17, further comprising:
the non-contact charger; and
the non-contact communicator.

20. A communication control method performed by a communication control device, the communication control method comprising:
acquiring, via communication based on a first non-contact communication method, terminal information of a portable terminal capable of being charged in a non-contact manner, the portable terminal being placed on or brought near to a non-contact charger disposed in a compartment of a vehicle; and
controlling, based on a device type of the portable terminal based on the acquired terminal information, transmission of information to the portable terminal by a non-contact communicator that is disposed in the vehicle in association with the non-contact charger and capable of performing communication based on a second non-contact communication method.

* * * * *